Feb. 15, 1938.  H. SCHOLLER ET AL  2,108,567
METHOD OF AND APPARATUS FOR THE SACCHARIFICATION
OF SUBSTANCES CONTAINING CELLULOSE
Filed Dec. 14, 1935  2 Sheets-Sheet 1

Fig. 1.

INVENTOR.
Heinrich Scholler &
BY Rudolf Eickemeyer
Wm. S. Pritchard
ATTORNEY.

Feb. 15, 1938. H. SCHOLLER ET AL 2,108,567
METHOD OF AND APPARATUS FOR THE SACCHARIFICATION
OF SUBSTANCES CONTAINING CELLULOSE
Filed Dec. 14, 1935 2 Sheets-Sheet 2
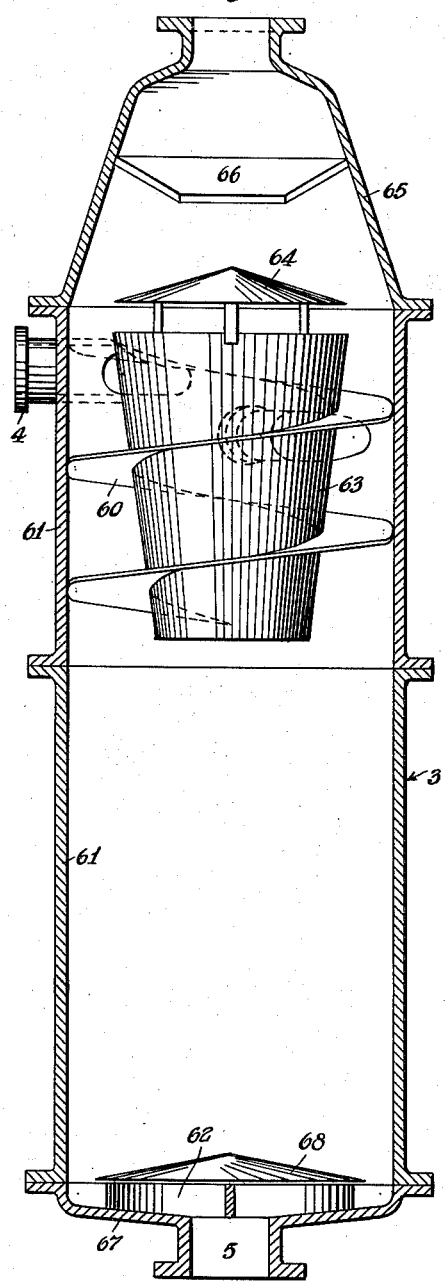
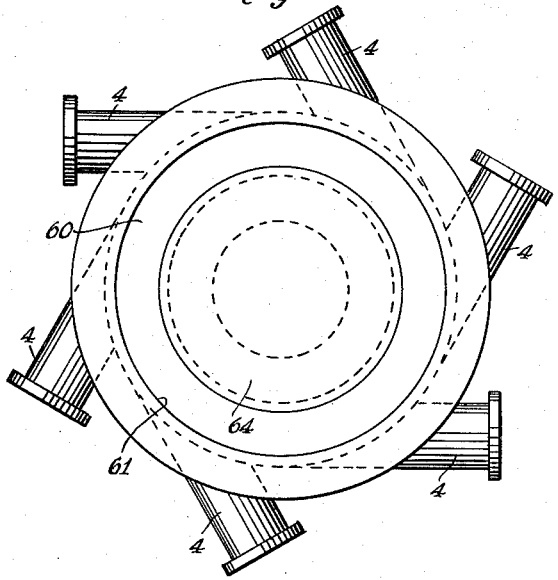
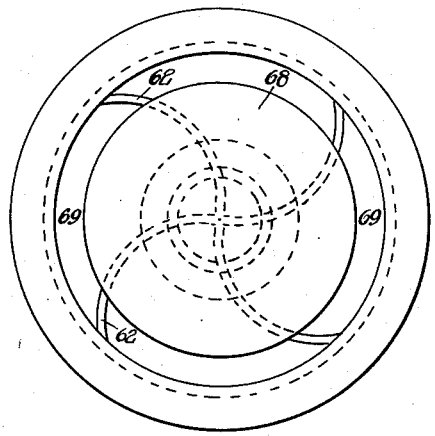
Heinrich Scholler
& Rudolf Seidenmeyer INVENTOR.
BY Wm. S. Pritchard
ATTORNEY.

Patented Feb. 15, 1938

2,108,567

UNITED STATES PATENT OFFICE 2,108,567

METHOD OF AND APPARATUS FOR THE SACCHARIFICATION OF SUBSTANCES CONTAINING CELLULOSE

Heinrich Scholler, Munich-Solln, and Rudolf Eickemeyer, Munich, Germany

Application December 14, 1935, Serial No. 54,410
In Germany February 11, 1935

22 Claims. (Cl. 127—37)

This invention relates to a method of and apparatus for the saccharification of substances containing cellulose by percolation under pressure with dilute acids.

In the well-known intermittent mode of operation definite batches of acid liquid flow at intervals through the cellulose material during the heating under pressure, take up the sugar that forms and remove it after a short while from the reaction chamber. In operating thus, it is advantageous to maintain the temperature of the batches of liquid below the reaction temperature of the cellulose material.

The object of the present invention is to improve this method of saccharification, particularly by effecting a substantial heat economy.

Contrary to the mode of operation hitherto employed, with which the sugar wort issuing from the percolators was cooled immediately in heat exchangers, the present method proposes first a partial expansion of the wort which issues under pressure and only thereafter the exchange of heat. In doing so the heat, in the partly expanded xylose wort, which can still be made available is appropriately transferred by countercurrent heat exchangers to fresh water which is to be used for the preparation of the percolation liquid.

The working method hitherto used did not allow good use to be made of the heat contained in the flowing-out sugar worts, inasmuch as the fresh water required heating only to temperatures considerably lower than the saccharification temperature. With the present method a portion of the heat contained in the wort withdrawn from the percolators is recovered in the form of steam, when the pressure on the wort is reduced, the heat remaining in the wort being sufficient to heat the fresh water used in the preparation of the percolating liquid to the desired batch temperature.

An illustrative procedure carrying out the method consists in first reducing the hot sugar wort, which issues at about 170° C. and 8 atmospheres excess pressure, in a pressure-releasing device to 2 atmospheres excess pressure, the wort being thereby cooled to the corresponding saturated steam temperature (in this case 132° C.). The sugar wort having a temperature of 132° C. then flows through a counter-current heat-exchange battery and is cooled there, as desired, to temperatures of, for example, from 30° C. to 100° C. by the water used in the preparation of the percolating liquid.

The steam liberated by the expansion of the wort is preferably used for other purposes and is also suitable for the evaporation of the sugar wort, if this is desired.

More or less pressure may be released, as desired or required in special cases. It is, however, expedient to release pressure to such an extent that the temperature of the sugar wort is lowered by at least 10° C. With the use of appropriate devices the expansion may also be carried to a temperature of 100° C. and atmospheric pressure. When removing the steam by suction by means of suitable devices, steam jet pumps and the like, the expansion may also be carried to temperatures below 100° C. In this case the wort should also be removed by suction as, for example, by means of a barometrical downpipe.

The invention may be utilized in processes wherein several percolators arranged next to each other or one after the other work simultaneously, but at different time intervals. The wort coming simultaneously from several percolators may be fed to a common expansion vessel, or if desired to several expansion vessels.

Where several percolators operate with one expansion vessel, it is expedient to feed the wort flowing out of the percolators in separate conduits to the expansion vessel into which it should be introduced through separate connections.

As is generally known, the sugar wort first flowing out of a freshly charged percolator may be subjected to a subsequent hydrolysis for the purpose of splitting off higher sugars. It is therefore advantageous, when using several percolators connected in parallel, to deliver the first fractions of wort obtained from batches of fresh fillings to a separately connected expansion vessel specifically provided for this fraction, which may also be succeeded by separately connected heat exchangers, while the later fractions which are not subjected to the subsequent hydrolysis are delivered to another expansion vessel with succeeding heat exchangers.

The expansion of the sugar wort coming from the percolator is more suitably carried to the point where the wort in flowing through the heat exchangers, after leaving the expansion vessel, heats the fresh water flowing in the opposite direction at most to temperatures approximately 20° C. below the reaction temperatures in the percolator. Since the fresh water may be warmed in this manner, if this is desired, the new method enables one, in contradistinction to the known method, to take advantage of the steam coming from the expansion vessel.

As the warming of the fresh water in the heat exchangers, by means of the wort which flows to meet it, is not uniform, a subsequent regulation of the temperature of the fresh water by means of a succeeding device is expedient. A steam jet heater arranged before the batch vessel may, for example, be used for this purpose. Such a subsequent warming of the fresh water that has been preheated in the heat exchangers is specially advantageous when starting the plant.

The heat contained in the vapors issuing from the expansion vessel is suitably made available by condensing these vapors.

The volatile substances contained in the vapors issuing from the expansion vessel, e. g. acetic acid, formic acid, furfurol and turpentines, etc., may be recovered by means of neutralization, rectification, absorption or condensation. These substances may be separated either before or after the condensation of the vapors coming out of the expansion vessel. The volatile acid substances, particularly acetic acid and formic acid, contained in the vapors may be separated in the well-known manner by alkaline agents in the form of salts, such as by passing through milk of lime or over dry or half-dry calcium hydroxide or caustic lime. The vapors of the expansion vessel which have been purified in this manner are suitably delivered, after the removal of the acid-volatile substances and in case alcohol is to be obtained, to an alcohol-distilling apparatus. They may be used both for the direct and the indirect heating of the alcohol still. In the latter case the substances contained in the condensate may still be recovered, while in the case of direct heating they mix with the mash and are lost.

The vapors coming from the expansion vessel may be similarly used, before or after the removal of the volatile substances, for the purpose of evaporating the sugar wort. The operation may be effected both with multiple evaporators and with single evaporators and heat pumps. The first body or bodies are suitably operated with pressure, while the rest of the evaporator bodies may be operated with a vacuum.

To obtain good heat economy, a uniform functioning of the plant and particularly a uniform operation of the wort pressure-release are essential. For this purpose a regulating valve is arranged in the pipe-connecting percolator and expansion vessel, which valve is controlled by the differences in pressure existing in the percolator between the space above the filling and the space below the filling, for example, indirectly influenced by means of a diaphragm relay. The operation of this regulating valve is, for example, as follows: It closes, if the pressure in the upper part of the percolator exceeds the pressure in the lower part of the percolator by more than 0.5 atmosphere, and it opens, if this difference of pressure is less than 0.5 atmosphere.

To insure uniform functioning, it is furthermore advantageous to have a regulating valve where the wort comes out of the expansion vessel. This wort-outflow-regulating valve is suitably controlled by the height of the level of the liquid in the expansion vessel. This control may be secured, for example, by indirect control through a diaphragm relay arranged at the upper and lower end of the expansion vessel. However, it is also possible to control the regulation valve by means of a float device communicating with the expansion vessel by the direct transmission of power from the float to the valve through rods or through a liquid pressure medium.

It has been found advantageous to arrange this regulation valve behind the heat exchangers, so that wort may flow through it that has already been cooled to a temperature of about 100° C. or below.

An illustrative apparatus for carrying out the process is shown in the drawings forming a part of this specification and wherein:

Figure 1 diagrammatically illustrates a plan view of an apparatus for carrying out the process.

Figure 2 is a partial central section of the expansion chamber.

Figure 3 is a top view of the device shown in Figure 2 with the parts 65 and 66 omitted.

Referring now to the drawings wherein like reference numerals designate like parts, the reference numeral 1 designates a percolator in which a cellulose-containing substance is caused to react under pressure and at an elevated temperature with dilute acid. The dilute acid is introduced preferably intermittently, into the percolator in the manner more fully explained hereafter. The percolator 1 is also provided with outlets 1' whereby the wort may pass from the percolator.

From the percolator 1 the wort is conducted by suitable piping through the regulating valve 2 and thence into an expansion chamber 3, through an inlet 4 disposed tangentially on the chamber 3 and extending into the canal formed by the guiding spiral, hereafter described.

The regulating valve 2 is indirectly controlled by a diaphragm relay 59 fitted to the upper part of the percolator and to the wort outlets 1' at the lower part of the percolator, for example, as shown in Figure 1. This valve is controlled by the difference in pressure existing in the percolator 1 spaced above the filling and the space below the filling or in the wort outlet. The valve is closed, when the pressure in the upper part of the percolator exceeds the pressure in the lower part of the percolator by more than 0.5 atmosphere. If this difference in pressure is less than 0.5 atmosphere, then the valve is opened.

In the interior of the vessel 3, the wort is transported downward by a guiding spiral 60 communicating with the inlet 4 and circling along the outer wall 61. At the bottom the wort is guided by suitably arranged guiding plates 62 and leaves by way of the connection 5 which is at the lower end of the expansion vessel 3. A liquid level indicator 6 is arranged for the purpose of observing the level of the liquid in the expansion vessel.

The guiding spiral 60 is attached between the outer wall 61 and an interior conical or tapered insertion 63, the attachment being effected in any suitable manner as by welding. The coniform insertion 63 has a smaller opening at the bottom than at the top and is covered by a roof 64 which extends into the upper part 65, in which additional guiding plates 66 may be provided.

The bottom piece 67 has an outlet 5 and is provided with guiding plates 62, mentioned before, which are covered by a coniform hood 68. Between the hood 68 and the wall of the bottom 67 there is an annular slot 69 which is open and through which the wort enters to be guided by the guiding plates 62 into the outlet. The guiding plates may be of any shape; a suitable form is that of a scoop.

Upon leaving the expansion chamber 3, the wort passes through a pipe 7 which is connected to the heat-exchange battery 8, to which is connected a regulation or control device 9. From the heat exchange 8 the wort passes through a pipe 10 and continues on its way to the neutralization plant and the plant for subsequent treatment.

The level of the liquid in the expansion vessel 3 is maintained at a definite height below the inlet 4 by means of the regulating device 9. This regulating device 9 may be a commercial indirectly-controlled regulator which is controlled by a diaphragm relay 11 connected to the upper and lower part of the expansion vessel. Compressed air, compressed oil or the like may be used to control the regulator.

The vapor or steam generated by the expansion of the wort in the expansion vessel 3 is conveyed by means of suitable guiding surfaces through the center of the expansion vessel into the outlet 12 in the upper part. The vapor is conducted through the pipe 13 to an adjustable overflow valve 14. This valve 14 maintains the vapor or steam pressure in the expansion vessel 3 at the desired amount (e. g. 2 atmospheres excess pressure). The vapor, after passing through the overflow valve 14, is conducted to an extraction vessel 15, in which the volatile substances contained in it, such as acetic acid, formic acid, furfurol, turpentines, etc., may be separated for further use by means of neutralization, rectification, absorption or condensation. The condensate thus yielded passes through the condenser 16. From the extraction vessel 15 the water vapor (steam) which is now purified passes into the steam accumulator 16. By means of a piping 17 and a suitable overflow valve 18, the steam accumulator 16 feeds the indirect heater 19 of the alcohol still 20. The resulting condensate leaves by way of the condenser 21. The indirect heater 19 is connected with the sump of the distilling column 20 by the two-ring circulation conduits 22 and 23. The column is heated in addition by a steam coil (steam chatter coil) 24 which is also introduced into the sump, which coil is supplied with live steam or other available steam by the pipe 25, stop valve 26 and supplementary pressure regulator 27.

The direction of the fresh water flow is opposite to that of the wort. The fresh water fed through the pipe 28 by the force water pump flows through the heat-exchange battery 8, in which it is preheated to the desired temperature, and then passes through the pipe 29 with the stop valve 30 into a regulating preheater 31, which has suitably the construction of a steam jet warmer. In the latter, the temperature of the water may be controlled by the direct injection of steam from the pipe 32 with the regulating valve 33, or it may be considerably increased in case the temperature reached in the heat exchangers should prove insufficient, which is the case when starting the plant.

From the regulating preheater 31, the preheated water passes into the mixing T-piece 35 which is provided with a pipe 34 in which a thermometer is inserted. The injection of steam is regulated in accordance with the indication of the thermometer by adjusting the valve 33 by hand or automatically.

Concentrated acid is pumped simultaneously in the manner well known into the mixing T-piece 35 by an acid pump coupled with the force water pump, through the pipe 36 with the stop valve 37, so that the readily-prepared dilute acid hot percolating liquid passes through the pipe 38 into the accumulator, or the so-called batch vessel 39. After the desired amount, as indicated by the water level indicator 40, has been introduced in the batch vessel 39, the percolating liquid batch is forced, by means of steam from the pipe 41 having a valve 42, by way of the pipe 43 having a stop valve 44 and a service valve 45, through the distributor piece 46 into the percolator 1.

If it is desired that the batch vessel 39 be eliminated from operation, provision is made for the forcing of acid and water into the supplementary mixing T-piece 51 and thence percolating liquid immediately into the pipe 43 and the percolator, by closing the valves 30, 37 and 44 and opening valves 47, 48 of a branch water pipe 49 and a branch acid pipe 50 respectively. In doing this, the temperature of the liquid can be regulated by the direct injection of live steam from the main 52, via the regulating valve 53 and the connecting conduit 54, into the distributor piece 46. This regulation is effected in accordance with the pressure indication of a pressure gauge 55 joined to the rapid closing device 56 of the percolator 1.

The distributing piece 46 consists of two annular spaces separated by a cylindrical partition, the outer annular space being fed with steam and the inner with percolating liquid. The lower sides of both annular spaces are provided with sieve-like perforations, so that both liquid and steam are uniformly distributed in the upper part of the percolator. The distributing piece 46 is inserted between the flange of the percolator on the one hand and the lower flange of the rapid-closing device 56 on the other hand.

Furthermore, a safety valve 57 is connected with the connecting pipe 54. A safety valve 58 is also provided on the batch vessel.

Though the foregoing apparatus has been described in connection with a single percolator, it is to be understood that the invention is equally applicable to plants using batteries of percolators as explained above.

Since it is obvious that various changes and modifications may be made in the above description without departing from the nature or spirit thereof, this invention is not restricted thereto except as set forth in the appended claims.

We claim:

1. A method for the saccharification of cellulose which comprises saccharifying cellulose-containing substances under pressure and at an elevated temperature with dilute acid, withdrawing the sugar wort produced in the reaction, reducing the pressure on the sugar wort in such a manner that the temperature of the wort is reduced at least 10° C., separating the vapors produced during the reduction in pressure from said wort, utilizing the heat in said vapors in an operation requiring an elevated temperature, and utilizing the heat remaining in the sugar wort for some operation in the process where heat is necessary.

2. A method for the saccharification of cellulose which comprises saccharifying cellulose-containing substances under pressure and at an elevated temperature with dilute acid, withdrawing the sugar wort produced in the reaction, reducing the pressure on the sugar wort in such a manner that the temperature of the wort is reduced at least 10° C., separating the vapors produced during the reduction in pressure from said wort, utilizing the heat in said vapors in an operation requiring an elevated temperature, and utilizing the heat remaining in the sugar wort to preheat the water to be used in the production of the dilute acid.

3. A method for the saccharification of cellulose which comprises saccharifying cellulose-containing substances under pressure and at an elevated temperature with dilute acid, withdrawing the sugar wort produced in the reaction, reducing the pressure on the sugar wort in such a manner that the temperature of the wort is reduced at least 10° C., separating the vapors produced during the reduction in pressure from said wort, utilizing the heat in said vapors in an operation requiring an elevated temperature, and utilizing the heat remaining in the sugar wort to preheat the water to be used in the production of the dilute acid to a temperature which is not more than 20° C. below the temperature at which the saccharification reaction is carried out.

4. A method for the saccharification of cellulose which comprises saccharifying cellulose-containing substances under pressure and at an elevated temperature with dilute acid, withdrawing the sugar wort produced in the reaction, reducing the pressure on the sugar wort whereby vapors comprising steam and volatile organic substances are produced, separating said vapors from said wort, separating the volatile organic substances from vapors, and utilizing the resulting steam in the further treatment of the wort.

5. A method for the saccharification of cellulose which comprises saccharifying cellulose-containing substances under pressure and at an elevated temperature with dilute acid, withdrawing the sugar wort produced in the reaction, reducing the pressure on the sugar wort whereby vapors comprising steam and volatile organic substances are produced, separating said vapors from said wort, separating the volatile organic substances from vapors, and utilizing the resulting steam in an operation requiring an elevated temperature.

6. A method for the saccharification of cellulose which comprises saccharifying cellulose-containing substances under pressure and at an elevated temperature with dilute acid, withdrawing the different fractions of sugar wort produced in reaction, reducing the pressure on the different fractions of wort, separating the vapors produced in the reduction of pressure from the different fractions of the wort, utilizing the heat in said vapors in an operation requiring an elevated temperature, and utilizing the heat remaining in the different fractions of the wort to preheat the water to be used in the production of the dilute acid.

7. A method for the saccharification of cellulose which comprises saccharifying cellulose-containing substances under pressure and at an elevated temperature with dilute acid in a percolator, controlling the removal of the sugar wort produced in the reaction by the difference in pressure above and below the filling in the percolator, transferring the sugar wort to an expansion chamber where the pressure is reduced and whereby vapors are produced, separating the vapors from the wort, controlling the quantity of wort in the expansion chamber by regulating the amount of wort removed from said chamber, removing the wort from said chamber when the temperature thereof is not over 100° C., and utilizing the heat remaining in the wort to preheat the water to be used in the production of the dilute acid.

8. An apparatus for the saccharification of cellulose comprising in combination a percolator in which the cellulose-containing substance is saccharified with dilute acid under heat and pressure, an expansion chamber, means to conduct the wort produced in the percolator to the expansion chamber, means to remove the vapors produced in the expansion chamber from the wort, means to remove the volatile organic substances from said vapors, a heat-exchange device, means to transfer the expanded wort to the heat-exchange device, means to introduce water into the heat-exchange device whereby it is preheated, means to increase the temperature of the preheated water, means to mix the water with acid, and means to introduce the thus diluted acid into the percolator.

9. An apparatus for the saccharification of cellulose comprising in combination a percolator, in which the cellulose-containing substance is saccharified under pressure and at an elevated temperature and having an outlet through which the wort may pass, an expansion chamber, means to conduct the wort from the percolator to the expansion chamber, and a regulating valve in the conducting means controlled by the difference in the pressures at the top and bottom of the said percolator.

10. In an apparatus for the saccharification of cellulose comprising in combination a percolator, in which the cellulose-containing substance is saccharified under pressure and at an elevated temperature and having an outlet through which the wort may pass, an expansion chamber, means to conduct the wort from the percolator to said expansion chamber, said expansion chamber having a spiral guide for the entering wort, an outlet for the vapors produced during the expansion, and an outlet for the expanded wort.

11. An apparatus for the saccharification of cellulose comprising in combination a percolator, in which the cellulose-containing substance is saccharified under pressure and at an elevated temperature and having an outlet through which the wort may pass, an expansion chamber, means to conduct the wort from the percolator to the expansion chamber, a regulating valve in the conducting means, a diaphragm relay connected to the upper part of the percolator and the wort outlet to control said valve, and means to maintain the liquid level in the said expansion chamber substantially constant.

12. In an apparatus for the saccharification of cellulose comprising in combination a percolator in which the cellulose-containing substance is saccharified under pressure and at an elevated temperature and having an outlet through which the wort may pass therefrom, an expansion chamber, means to conduct the wort from the percolator to the expansion chamber, and means cooperating with said expansion chamber to control the pressure therein.

13. In an apparatus for the saccharification of cellulose comprising in combination a percolator in which the cellulose containing substance is saccharified under pressure and at an elevated temperature and having an outlet through which the wort may pass therefrom, an expansion chamber, means to conduct the wort from the percolator to the expansion chamber, said expansion chamber being provided with an outlet and piping through which the vapors produced during the expansion may pass, and means in said piping controlling the pressure within the expansion chamber.

14. A method for the saccharification of cellulose which comprises saccharifying cellulose-containing substances under pressure and at an elevated temperature with dilute acid, withdrawing the sugar wort produced in the reaction, reducing the pressure on the sugar wort, separating the vapors produced during the reduction in pressure from said wort, utilizing the heat in said vapors in an operation requiring an elevated temperature, and utilizing the heat remaining in the sugar wort for some operation in the process where heat is necessary.

15. A method for the saccharification of cellulose which comprises saccharifying cellulose-containing substances under pressure and at an elevated temperature with dilute acid, withdrawing the sugar wort produced in the reaction, reducing the pressure on the sugar wort, separating the vapors produced during the reduction in pressure from said wort, utilizing the heat in said vapors in an operation requiring an elevated temperature, and utilizing the heat remaining in the sugar wort to preheat the water to be used in the production of the dilute acid.

16. A method for the saccharification of cellulose which comprises saccharifying cellulose-containing substances under pressure and at an elevated temperature with dilute acid, withdrawing the sugar wort produced in the reaction, reducing the pressure on the sugar wort, separating the vapors produced during the reduction in pressure from said wort, utilizing the heat in said vapors in the further treatment of the wort, and utilizing the heat remaining in the sugar wort for some operation in the process where heat is necessary.

17. A method for the saccharification of cellulose which comprises saccharifying cellulose-containing substances under pressure and at an elevated temperature with dilute acid, withdrawing the sugar wort produced in the reaction, reducing the pressure on the sugar wort, separating the vapors produced during the reduction in pressure from said wort, utilizing the heat in said vapors in the further treatment of the wort, and utilizing the heat remaining in the sugar wort to preheat the water to be used in the production of the dilute acid.

18. A method for the saccharification of cellulose which comprises saccharifying cellulose-containing substances under pressure and at an elevated temperature with dilute acid, withdrawing the sugar wort produced in the reaction, reducing the pressure on the sugar wort, separating the vapors produced during the reduction in pressure from said wort, removing the volatile organic substances from said vapors, utilizing the heat in the purified vapors in an operation requiring an elevated temperature, and utilizing the heat remaining in the sugar wort for some operation in the process where heat is necessary.

19. A method for the saccharification of cellulose which comprises saccharifying cellulose-containing substances under pressure and at an elevated temperature with dilute acid, withdrawing the sugar wort produced in the reaction, reducing the pressure on the sugar wort, separating the vapors produced during the reduction in pressure from said wort, removing the volatile organic substances from said vapors, utilizing the heat in the purified vapors in an operation requiring an elevated temperature, and utilizing the heat remaining in the sugar wort to preheat the water to be used in the production of the dilute acid.

20. A method for the saccharification of cellulose which comprises saccharifying cellulose-containing substances under pressure and at an elevated temperature with dilute acid, withdrawing the sugar wort produced in the reaction, reducing the pressure on the sugar wort, separating the vapors produced during the reduction in pressure from said wort, removing the volatile organic substances from said vapors, utilizing the heat in the purified vapors in the further treatment of the wort, and utilizing the heat remaining in the sugar wort for some operation in the process where heat is necessary.

21. A method for the saccharification of cellulose which comprises saccharifying cellulose-containing substances under pressure and at an elevated temperature with dilute acid, withdrawing the sugar wort produced in the reaction, reducing the pressure on the sugar wort, separating the vapors produced during the reduction in pressure from said wort, removing the volatile organic substances from said vapors, utilizing the heat in the purified vapors in the further treatment of the wort, and utilizing the heat remaining in the sugar wort to preheat the water to be used in the production of the dilute acid.

22. In an apparatus for the saccharification of cellulose comprising in combination a percolator in which the cellulose-containing substance is saccharified under pressure and at an elevated temperature and having an outlet through which the wort may pass, an expansion chamber having an inlet disposed tangentially thereon and communicating with a spiral guide, means to conduct the wort from the percolator and introduce it through said inlet into the expansion chamber, means in the upper part of the expansion chamber to permit withdrawal of the vapors produced during the expansion, and means in the lower part of the expansion chamber to permit withdrawal of the expanded wort.

HEINRICH SCHOLLER.
RUDOLF EICKEMEYER.